United States Patent
Watabe et al.

(10) Patent No.: US 6,726,379 B2
(45) Date of Patent: Apr. 27, 2004

(54) CAMERA FOCAL PLANE SHUTTER

(75) Inventors: Kenichi Watabe, Tokyo (JP); Hiroshi Miyasaki, Tokyo (JP)

(73) Assignee: Nidec Copal Corporation, Tokyo (JP)

( * ) Notice: Subject to any disclaimer, the term of this patent is extended or adjusted under 35 U.S.C. 154(b) by 0 days.

(21) Appl. No.: 10/104,680

(22) Filed: Mar. 22, 2002

(65) Prior Publication Data

US 2002/0136555 A1 Sep. 26, 2002

(30) Foreign Application Priority Data

Mar. 26, 2001 (JP) ..................... P2001-087508

(51) Int. Cl.[7] .............. G03B 9/08; G03B 9/40
(52) U.S. Cl. ...................... 396/456; 396/489
(58) Field of Search .............. 396/483, 484, 396/485, 486, 488, 489, 452, 453, 457, 463, 455, 456, 469

(56) References Cited

U.S. PATENT DOCUMENTS

| 4,338,013 A | | 7/1982 | Shimada |
| 4,847,649 A | * | 7/1989 | Toyoda et al. ............... 396/456 |

FOREIGN PATENT DOCUMENTS

| JP | 62223736 | 10/1987 | |
| JP | 6326831 | 11/1994 | |
| JP | 09-138439 | 11/1995 | |
| JP | 8-88986 | * 4/1996 | ............ G03B/9/02 |

* cited by examiner

*Primary Examiner*—Russell Adams
*Assistant Examiner*—Rochelle Blackman
(74) *Attorney, Agent, or Firm*—Pillsbury Winthrop LLP (57) ABSTRACT

A camera focal plane shutter according to the invention comprises a shutter blade for opening and closing an exposure aperture to carry out an exposure operation; an electromagnetic actuator for directly driving the shutter blade, and a positioning means for positioning the shutter blade at an operation starting position. This positioning means is comprised of a swing arm supported in a manner enabling it to swing so as to comes into contact with and separate from a drive pin of a rotor, a torsion spring for applying a pushing force so as to push one end of the swing arm against the drive pin, and an eccentric pin which stops the swing arm at a position with a predetermined angle against the pushing force of the torsion spring. Therefore, an impulse force caused by the movement of the shutter blade is eased, and the shutter blade is easily positioned with high accuracy at the operation starting position.

7 Claims, 13 Drawing Sheets

CAMERA FOCAL PLANE SHUTTER

BACKGROUND OF THE INVENTION

1. Field of the Invention

The present invention relates to a camera focal plane shutter in which a shutter blade for opening and closing an exposure aperture is directly driven by an electromagnetic drive source.

2. Description of the Related Art

As conventional camera focal plane shutters which are mounted in cameras and driven by electromagnetic actuators, for example, those disclosed in Japanese Unexamined Patent Publications No.56-99330 and No.62-223736, and Japanese Unexamined Utility Model Publication No.63-26831 have been generally known.

Figure 1:
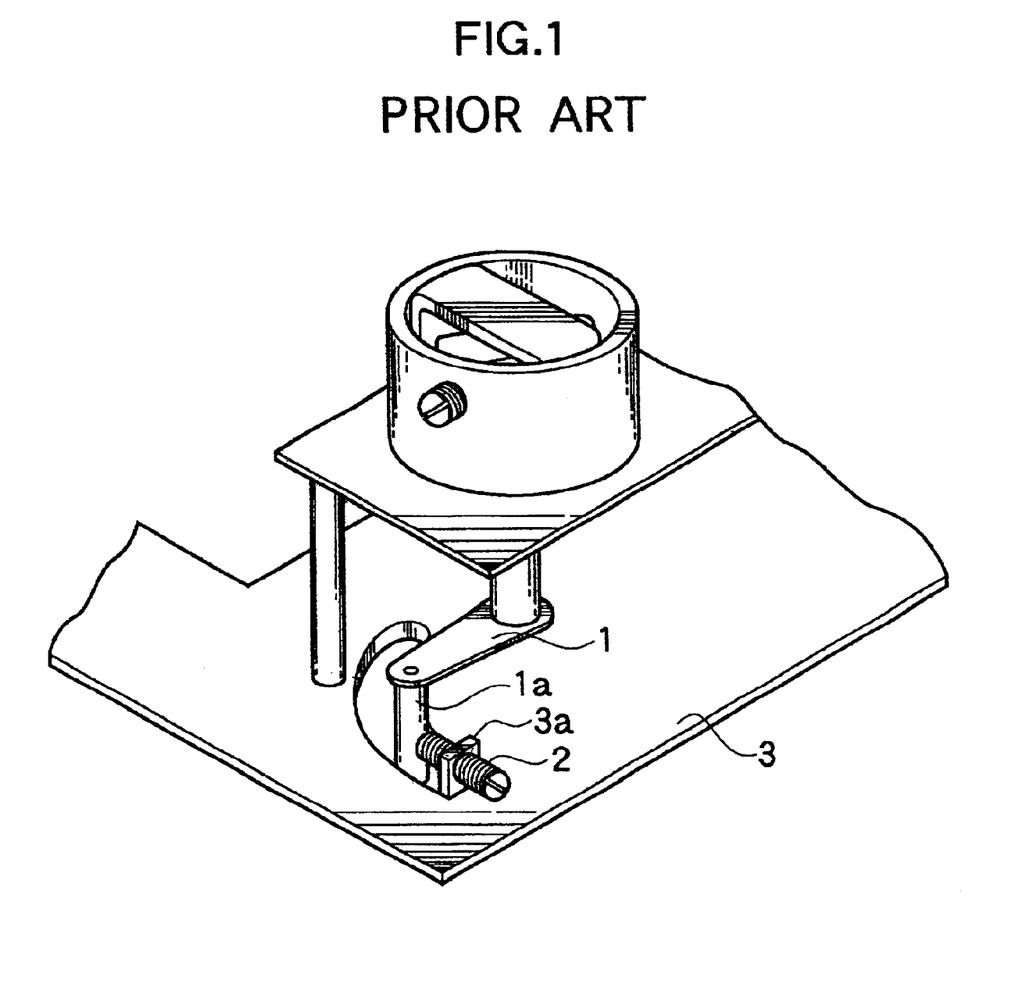
FIG. 1 is a perspective view showing a positioning structure in a conventional camera focal plane shutter.

The camera focal plane shutter disclosed in Japanese Unexamined Patent Publication No.56-99330 is provided with, as shown in FIG. 1, a set screw 2 which can be contacted by a drive pin 1a connected to drive arm 1 so as to position the shutter blade at a predetermined starting position (operation starting position). The set screw 2 is screwed and fitted to a curved piece 3a of a base plate 3, and by adjusting the screwing position, the contact position of the drive pin 1a with the set screw 2, that is, the starting position of the shutter blade is adjusted.

The camera focal plane shutter disclosed in Japanese Unexamined Patent Publication No.62-223736 is provided with a position restricting member which can restrict the starting position of the shutter blade and adjust the position of the shutter blade. Furthermore, the camera focal plane shutter disclosed in Japanese Unexamined Utility Model Publication No.63-26831 uses the edge of a slot made in the base plate to restrict the starting position of the shutter blade.

However, in the camera focal plane shutter disclosed in Japanese Unexamined Patent Publication No.56-99330, when the electromagnetic actuator is driven rearward to return the shutter blade to the starting position after an exposure operation is finished, the drive pin 1a directly collides with the set screw 2, and this causes a collision noise, and when the shutter is repeatedly operated, the shutter may be broken. Therefore, the shutter has a problem in durability.

On the other hand, to return the shutter blade to the starting position, it can also be considered that the operation speed is lowered by lowering the driving force of the electromagnetic actuator, however, in this case, problems occur in that the operation sequence lengthens and the frame speed lowers when carrying out serial photographing.

Furthermore, in the camera focal plane shutters disclosed in Japanese Unexamined Patent Publication No.62-223736 and Japanese Unexamined Utility Model Publication No.63-26831, power supply (energization) in a direction opposite to the operation direction is always required immediately before operating, and a problem may occur due to an impulse force when positioning as mentioned above.

The present invention has been made in view of the above-mentioned circumstances, and the object thereof is to provide a camera focal plane shutter which has excellent durability while having a simple structure and enables easy positioning of the shutter blade at an operation starting position and adjustments of the operation starting position.

SUMMARY OF THE INVENTION

A camera focal plane shutter according to a first aspect of the present invention comprises a shutter blade which opens and closes an exposure aperture to carry out exposure; an electromagnetic drive source for directly driving the shutter blade; an interlocking member for interlocking with the shutter blade; and a positioning means for positioning the shutter blade at an operation starting position. This positioning means has a contact member which can come into contact with the interlocking member and is movably supported; a pushing member for producing (applying) a pushing force to push the contact member against the interlocking member; and a stopper for stopping the contact member at a predetermined position against the pushing force of the pushing member.

According to this construction, when the shutter blade is positioned at the operation start position, the interlocking member comes into contact with the contact member to retreat the contact member by a predetermined amount against the pushing force of the pushing member. During this motion, the impulse force is eased, and the pushing force of the pushing member charged by the retreat of the contact member pushes back the contact member to come into contact with the stopper, whereby the shutter blade is positioned at the operation starting position.

That is, since the positioning means positions the shutter blade while easing the impulse force due to the inertial force of the shutter blade, a collision noise is suppressed, part breakage is prevented, and durability is improved.

The above-mentioned construction may be arranged so as to include an absorbing (shock absorbing) member which comes into contact with the interlocking member to ease an impulse force after the contact member comes into contact with the interlocking member when the shutter blade is returned to the operation starting position after an exposure operation.

According to this construction, the contact member makes first absorbing action, and following this, the absorbing member makes second absorbing action, so that the impulse force can be securely absorbed and eased.

The above-mentioned construction may be arranged so that the interlocking member is a drive arm to which a driving force is directly applied from the electromagnetic drive source and which is connected to a part of the shutter blade, the contact member is a swing arm supported around a predetermined shaft in a swinging manner, and the pushing member is a torsion spring which is disposed around the predetermined shaft, and which is latched on the stopper at one end and is latched on the swing arm at the other end.

According to this construction, to position the shutter blade at the operation starting position, the drive arm comes into contact with the swing arm to rotate and retreat the swing arm by a predetermined amount against the pushing force of the pushing member. During this motion, the impulse force is eased, and by the pushing force of the torsion spring charged by the retreat of the swing arm, the swing arm is rotated in the opposite direction and comes into contact with the stopper, whereby the shutter blade is positioned at the operation starting position.

A camera focal plane shutter according to a second aspect of the present invention comprises a shutter blade which opens and closes an exposure aperture to carry out an exposure operation; an electromagnetic drive source for directly driving the shutter blade; an interlocking member for interlocking with the shutter blade; and an elastic member, one end of which is fixed and the other end of which can elastically deform when coming into contact with the interlocking member so as to position the shutter blade at the operation starting position.

According to this construction, to position the shutter blade at the operation starting position by means of a driving force of the electromagnetic drive source, when the interlocking member collides with the elastic member due to an inertial force, the elastic member elastically deforms and absorbs the impulse force, and thereafter, by means of an elastic energy charged by the deformation, the interlocking member is pushed back to position the shutter blade. Therefore, even in a simple structure, a collision noise is suppressed, part breakage is prevented, and durability is improved. By only adjusting the attaching angle of the elastic member, the operation starting position of the shutter blade can be properly set at a desired position.

BRIEF DESCRIPTION OF THE DRAWINGS

FIG. 4A, FIG. 4B, and FIG. 4C are drawings for explaining the operation of the positioning means, wherein

FIG. 8A, FIG. 8B, and FIG. 8C show another embodiment of the positioning means, wherein

FIG. 9A, FIG. 9B, and FIG. 9C show still another embodiment of the positioning means, wherein

DETAILED DESCRIPTION OF THE PREFERRED EMBODIMENTS

Hereinafter, embodiments of the invention are explained with reference to the attached drawings.

Figure 2:
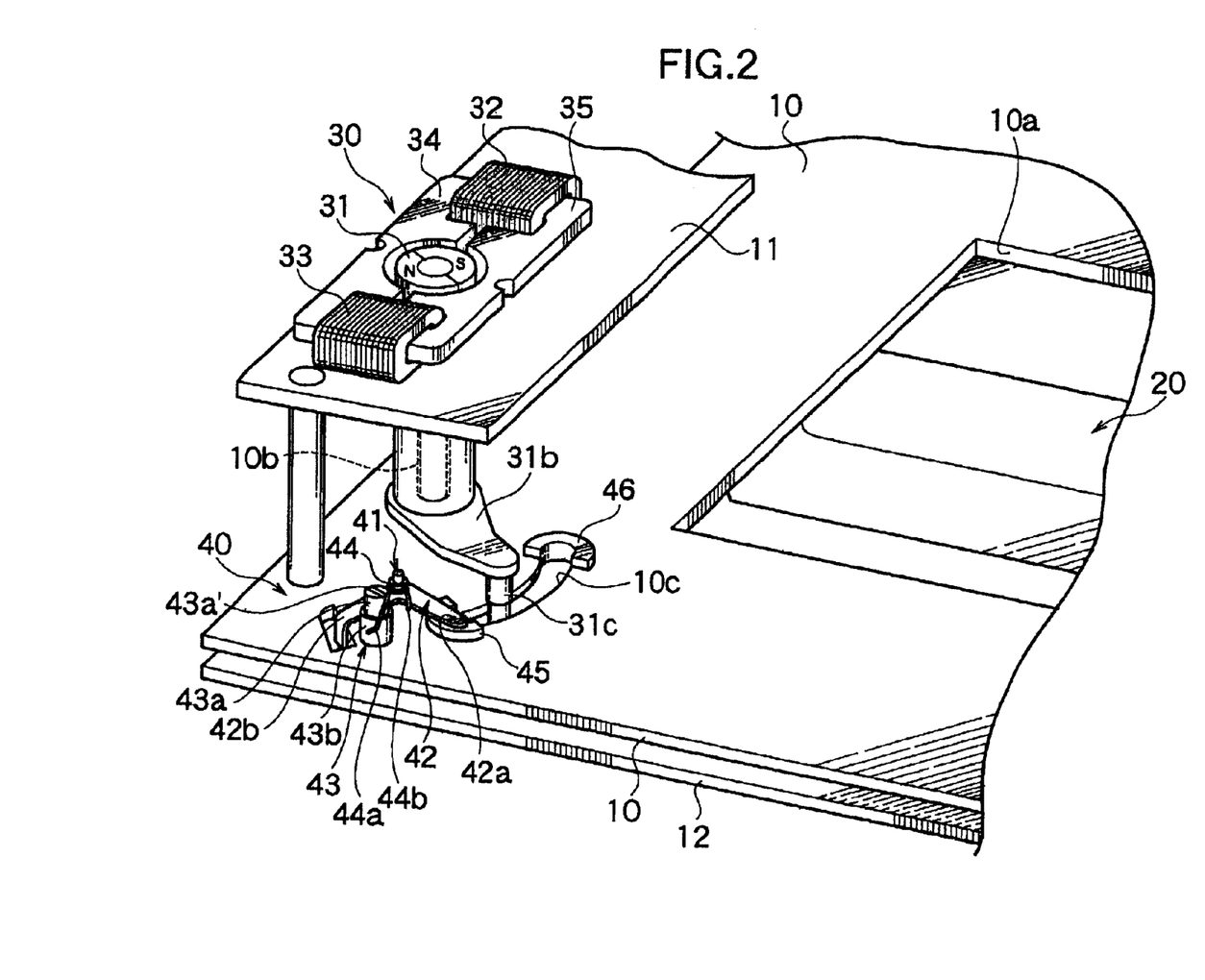
FIG. 2 is a perspective view showing an embodiment of a camera focal plane shutter according to the invention.

FIG. 2 through FIG. 7 show an embodiment of the camera focal plane shutter of the invention. The camera focal plane shutter relating to this embodiment comprises, as shown in FIG. 2, a base plate 10 with an exposure aperture 10a, a shutter blade 20 for opening and closing the aperture 10a, an electromagnetic actuator 30 which is disposed at the left side of the aperture 10a as an electromagnetic drive source for directly driving the shutter blade 20, and a positioning means 40 for positioning the shutter blade 20 at the operation starting position.

Figure 3:
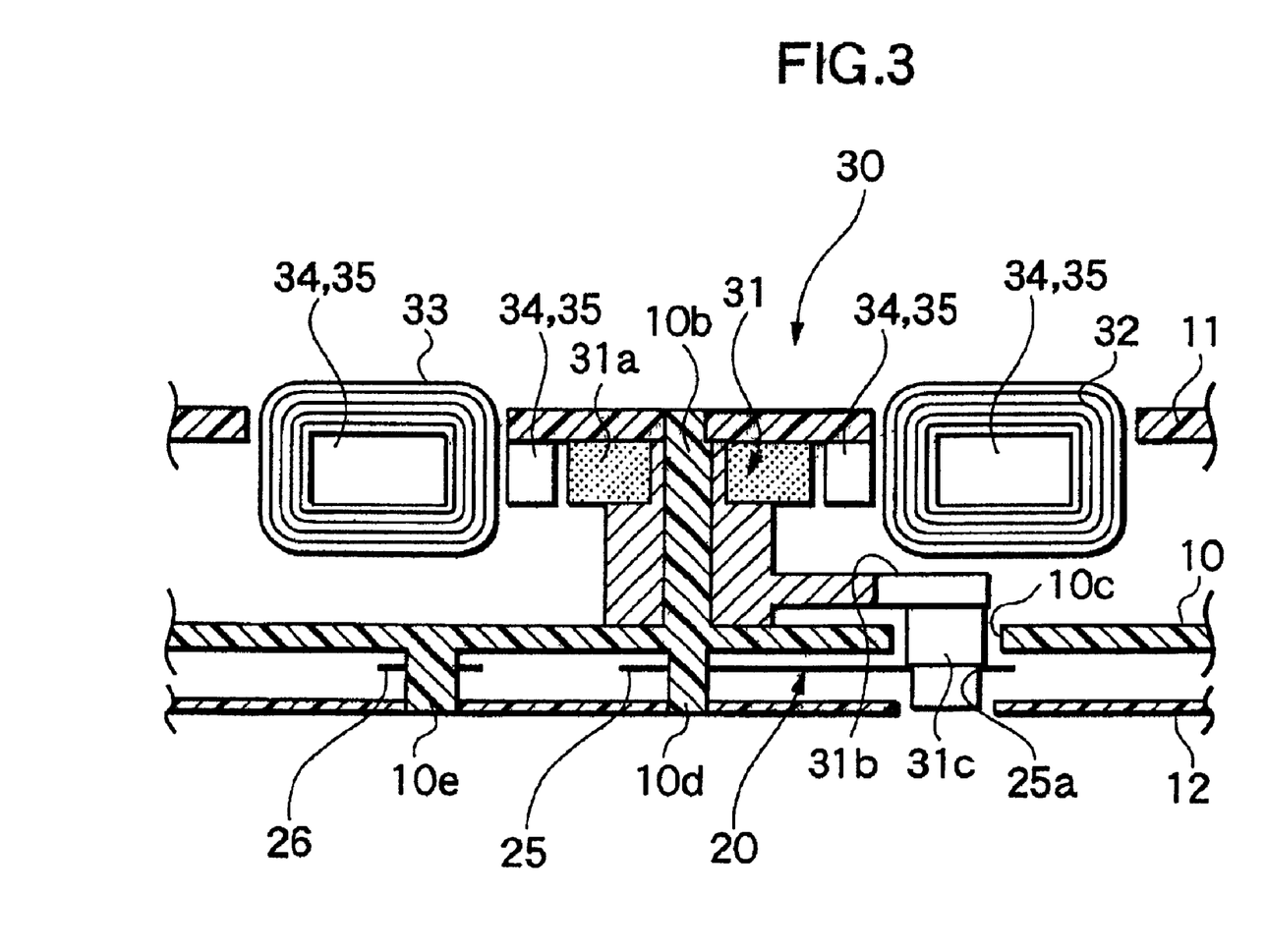
FIG. 3 is a sectional view showing the portion of an electromagnetic actuator.

The electromagnetic actuator 30 is comprised of, as shown in FIG. 2 and FIG. 3, a flat and rotatable rotor 31 magnetized to have different polarities, a first coil 32 and a second coil 33 which are wound flat for excitation, and a first yoke 34 and a second yoke 35 which are flat plates and form a magnetic circuit. The rotor 31 is rotatably supported by a support shaft 10b which is formed so as to project from the base plate 10, and the first yoke 34 and the second yoke 35 are held by a holding plate 11 fixed to the base plate 10.

As shown in FIG. 2 and FIG. 3, the rotor 31 is comprised of a magnetized portion 31 which is formed into a flat disk shape and magnetized to an N pole and an S pole, a drive arm 31b as an interlocking member for interlocking the shutter blade 20 by externally outputting a rotational driving force, and a drive pin 31c which is joined with the front end of the drive arm 31b to form a part of the arm and is connected to the shutter blade 20. As shown in FIG. 2 and FIG. 3, the drive pin 31c is connected to a part (a slot 25a of a first arm 25 described later) of the shutter blade 20 disposed between the base plate 10 and a cover plate 12 through an arc guide hole 10c. Therefore, when the rotor 31 rotates, the shutter blade 20 is directly driven.

Figure 5:
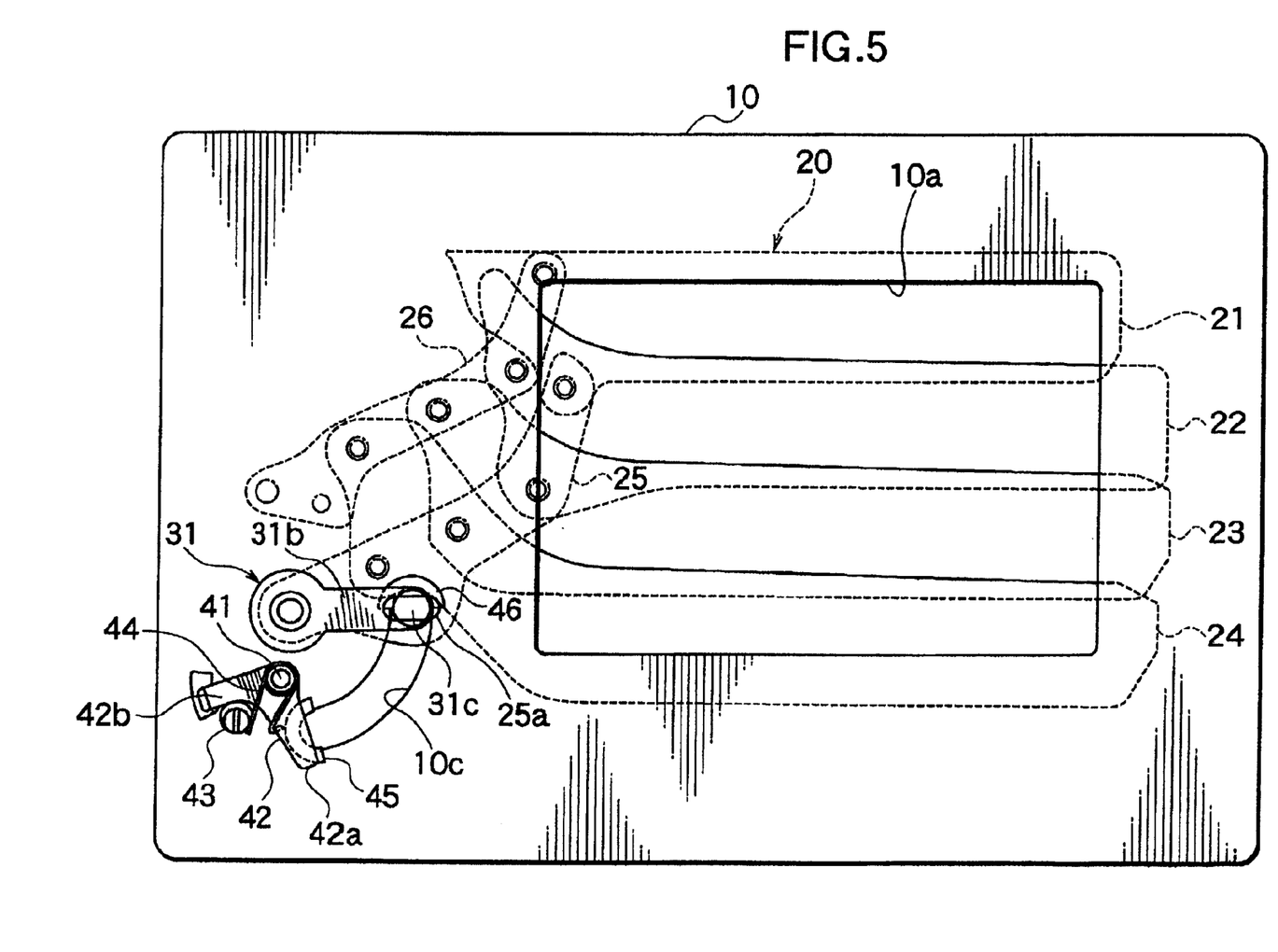
FIG. 5 is a plan view showing a condition where the shutter blade has run and closed the aperture in an embodiment.

The shutter blade 20 is comprised of, as shown in FIG. 5, a plurality (herein, four) of blades 21, 22, 23, and 24, and a first arm 25 and a second arm 26 which connect the blades 21 through 24 in a rotatable manner. The first arm 25 and the second arm 26 are rotatably supported by support shafts 10d and 10e, respectively, as shown in FIG. 3.

Figure 7:
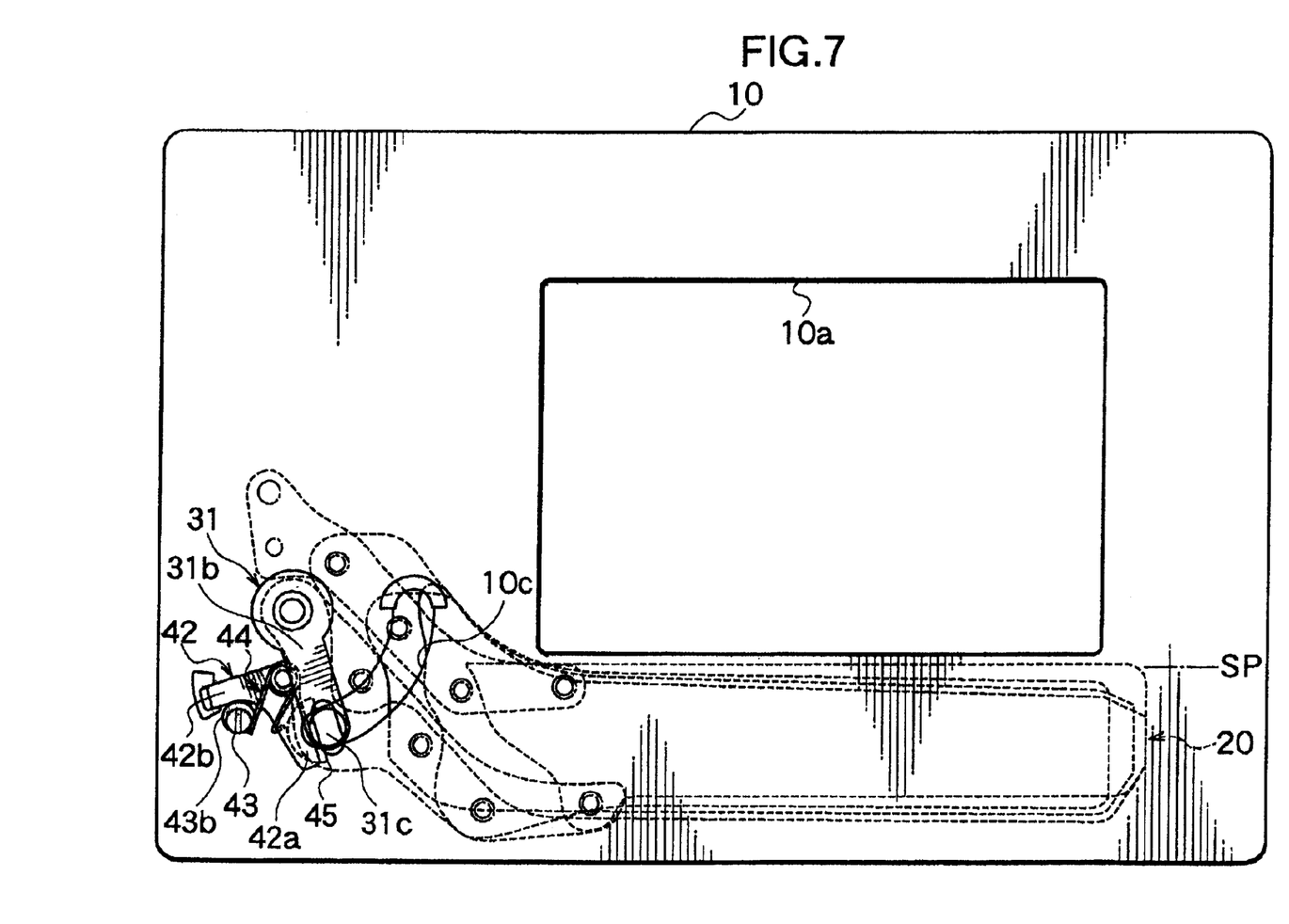
FIG. 7 is a plan view showing a condition where the shutter blade has been positioned at the operation starting position in an embodiment.

As shown in FIG. 5, the drive pin 31c of the electromagnetic actuator 30 is connected into the slot 25a of the first arm 25. Therefore, when the rotor 31 rotates by approximately 70°, the first arm 25 and the second arm 26 swing, and the blades 21 through 24 linearly reciprocate between the opening position where the blades are overlapped at the lower side and open the aperture 10a as shown in FIG. 7 and the closing position where the blades are developed to the upper side and close the aperture 10a as shown in FIG. 5.

The positioning means 40 is comprised of a swing arm 42 as a contact member supported around a support shaft 41 as a predetermined shaft provided on the base plate 10 in a manner enabling the arm to swing (move), an eccentric pin 43 as a stopper fastened to the base plate 10, and a torsion spring 44 as a pushing member disposed around the support shaft 41.

Figure 4A:
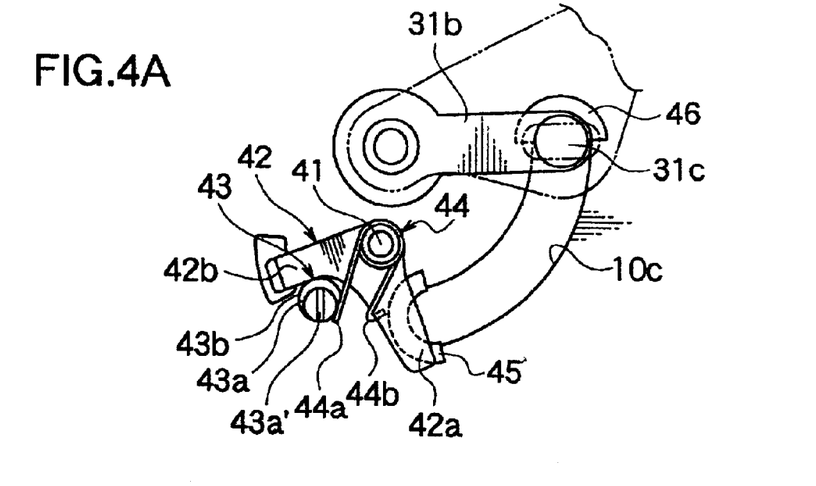
FIG. 4A is a plan view showing a condition after the shutter blade has run.
Figure 4B:
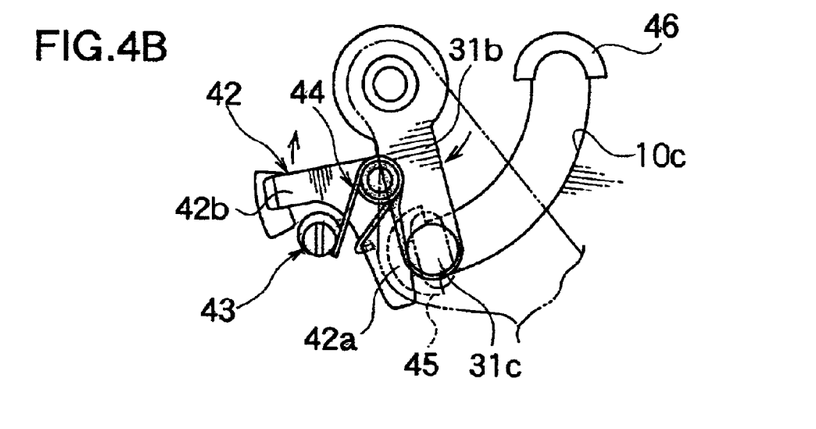
FIG. 4B is a plan view showing a condition where the shutter blade has moved to the operation starting position side and retreated the swing arm.
Figure 4C:
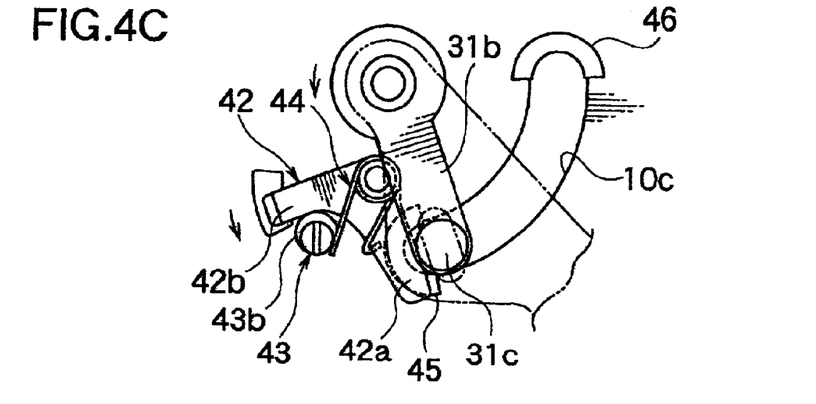
FIG. 4C is a plan view showing a condition where the swing arm has pushed back the drive pin and positioned the shutter blade at the operation starting position.

The swing arm 42 is formed into a rough L shape as shown in FIG. 2 and FIG. 4, and disposed so that one end 42a of the arm faces the vicinity of one end of the guide hole 10c, and the other end 42b faces the other side across the eccentric pin 43. Then, the end 42a comes into contact with and separates from the drive pin 31c, and the other end 42b comes into contact with and separates from a cam portion 43b of the eccentric pin 43.

The eccentric pin 43 is comprised of, as shown in FIG. 2 and FIG. 4, a columnar portion 43a positioned at the upper side and the cam portion 43b which is positioned at the lower side and has a cam surface at the outer circumference. Furthermore, a groove 43a to be used for adjusting the attaching angle is formed at the upper surface of the columnar portion 43a. The lower side of the cam portion 43b is formed into a shape with a reduced diameter, inserted through the base plate 10, and attached to the base plate 10 by a caulking with a spring washer so as to have a predetermined frictional force. Therefore, the attaching angle is changed by inserting a screwdriver into the groove 43a', whereby the cam portion 43b that is in contact with the other end 42b can be adjusted and held at a desired angled position, and this makes it possible to adjust the stopping position of the swing arm 42.

Regarding the torsion spring 44, as shown in FIG. 2 and FIG. 4, the end 44a is latched on the columnar portion 43a of the eccentric pin 43, and the other end 44b is latched on one end 42a of the swing arm 42, whereby the torsion spring 44 pushes the swing arm 42 in a direction for making the other end 42b come into contact with the cam portion 43b (counterclockwise in FIG. 4).

As shown in FIG. 2 and FIG. 4, one end side of the guide hole 10c of the base plate 10 is provided with a rubber 45 as an absorbing member for absorbing an impulse force caused by the contact of the drive pin 31c. A similar rubber 46 is also provided at the other end side of the guide hole 10c.

Next, in the case that this camera's focal plane shutter is carried on a digital still camera, the operation is explained with reference to FIG. 4 through FIG. 7.

First, when the camera main switch is turned ON and the photographing is completed, as shown in FIG. 4A and FIG. 5, the rotor 31 (drive arm 31b) rotates counterclockwise by approximately 70° (within a useful angle range), the drive pin 31c comes into contact with the rubber 46 at the upper side end of the guide hole 10c, and the shutter blade 20 stops at the position at which the shutter blade 20 has closed the aperture 10a.

Figure 6:
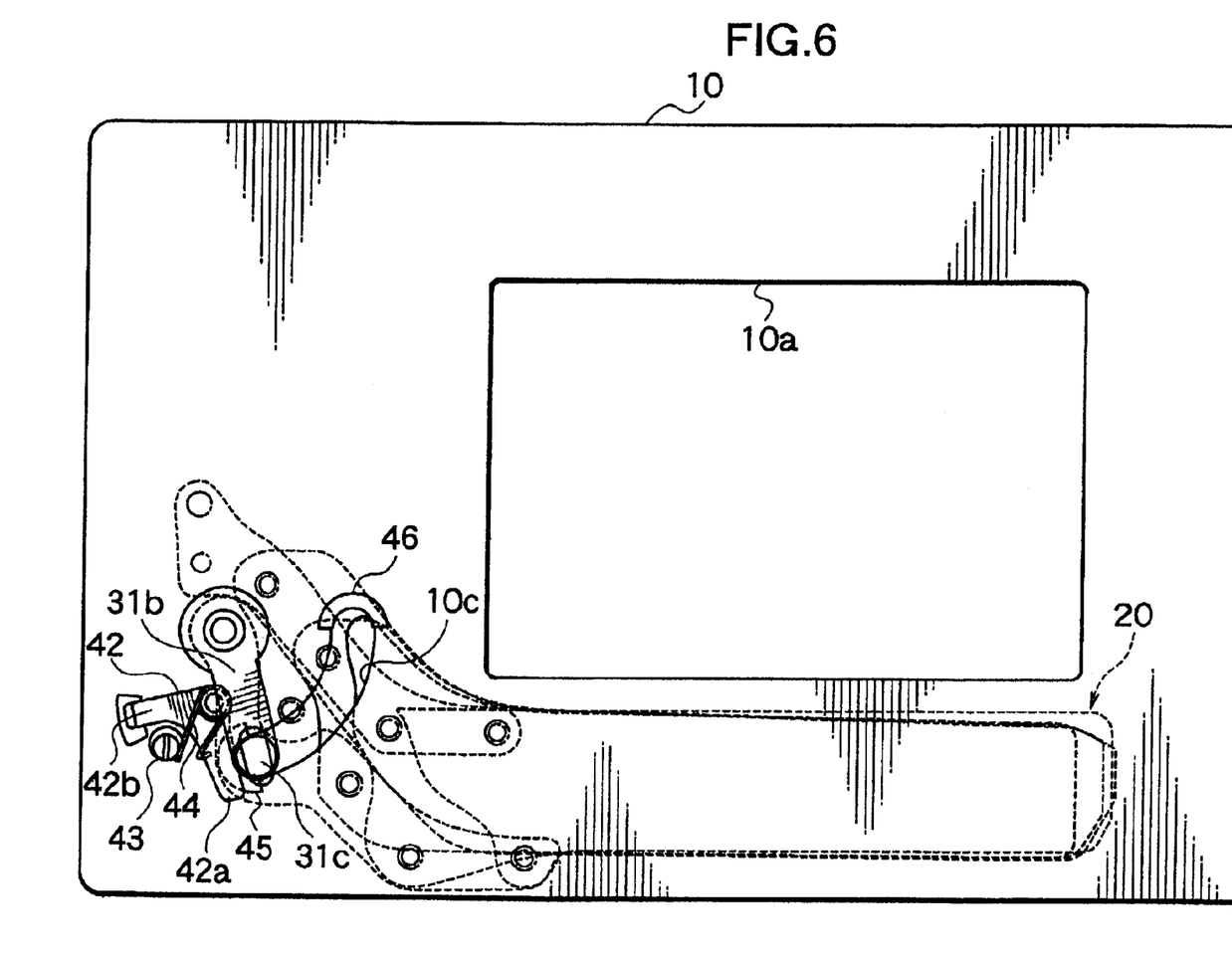
FIG. 6 is a plan view showing a condition where the shutter blade has moved to the operation start position and opened the aperture before the shutter blade is positioned at the operation starting position in an embodiment.

Thereafter, processing for storing images picked-up by a CCD is executed, the rotor 31 (drive arm 31b) is rotated clockwise, and the drive pin 31c moves toward the lower end of the guide hole 10c. At the same time, the shutter blade 20 also moves toward the opening position. Then, the drive pin 31c rotates the swing arm 42 by means of the inertial force against the pushing force of the torsion spring 44 while being in contact with the one end 42a. Thereafter, as shown in FIG. 4B and FIG. 6, the drive pin 31c comes into contact with the rubber 45 and slightly compresses and deforms the rubber 45 and then stops. In this process, the impulse force due to the collision of the drive pin 31c is converted into charged energy of the torsion spring 44 and is absorbed and eased by the deformation of the rubber 45.

Thus, when the shutter blade 20 is returned to the operation starting position by the rotational driving force of the rotor 31, since the positioning means 40 and the rubber 45 absorb and ease the impulse force due to the inertial force of the shutter blade 20, the collision noise is suppressed, part breakage is also prevented, and durability is improved.

Then, as shown in FIG. 4C and FIG. 7, by the pushing force of the charged torsion spring 44, the swing arm 42 is rotated counterclockwise, and the one end 42a pushes back the drive pin 31c and separates the drive pin 31c from the rubber 45, and the other end 42b comes into contact with the cam portion 43b, whereby the swing arm 42 stops.

At this time, a magnetic urging force that generates a clockwise rotation force in the non-energized condition acts on the rotor 31, while the pushing force of the torsion spring 44, which is greater than the magnetic urging force, acts on the swing arm 42 in the opposite direction.

Therefore, the drive pin 31c comes into contact with one end 42a of the swing arm 42, and the other end 42b comes into contact with the cam portion 43b and stops, and at the same time, the drive pin 31c stops. Accordingly, the shutter blade 20 is positioned at the operation starting position SP.

Thus, since the shutter blade 20 is positioned in advance at the predetermined operation starting position SP by the positioning means 40 before starting an exposure operation, timing accuracy is improved, and therefore, an exposure operation is started at a stable predetermined timing, and an exposure operation which is stable as a whole is realized.

In this standby state, when a photographer carries out a release operation, the rotor 31 starts rotating counterclockwise, the shutter blade 20 momentarily develops and moves to the closing position again as shown in FIG. 5 to complete the exposure operation.

Thereafter, the same sequence is repeated for photographing. In the case of serial photographing, high-speed serial photographing is also possible without lowering the frame speed.

The operation starting position SP is set to be a desired proper position by adjusting the angular position of the eccentric pin 43. For example, in the condition shown in FIG. 4C, when the attaching angle of the cam portion 43b is changed so that the other end 42b of the swing arm 42 comes into contact with the lower portion of the cam surface of the cam portion 43b, the swing arm 42 stops at a angular position after further rotating counterclockwise in the standby state. As a result, a position closer to the aperture 10a than the position shown in FIG. 7 is set as an operation starting position of the shutter blade 20.

Figure 8A:
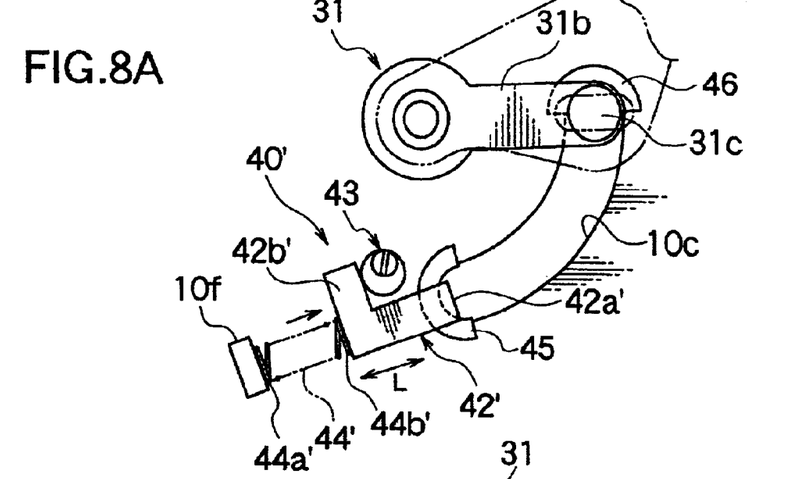
FIG. 8A is a plan view showing a condition after the shutter blade has run.
Figure 8B:
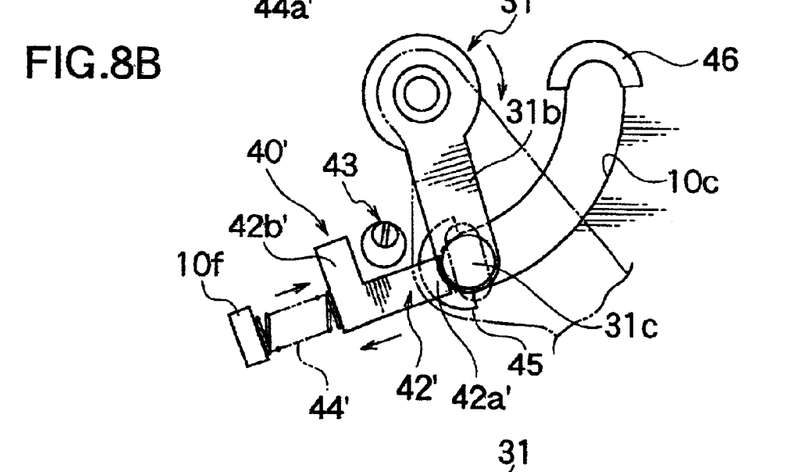
FIG. 8B is a plan view showing a condition where the shutter blade has moved to the operation starting position side and retreated the swing arm.
Figure 8C:
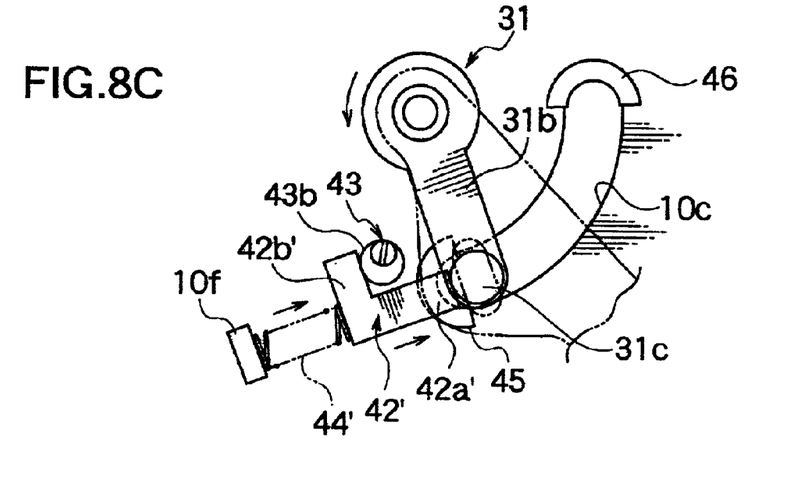
FIG. 8C is a plan view showing a condition where the swing arm has pushed back the drive pin and positioned the shutter blade at the operation starting position.

FIG. 8A, FIG. 8B, and FIG. 8C show another embodiment of the camera focal plane shutter according to the invention, wherein since the construction is the same as in the above-mentioned embodiment except for a different positioning means 40' employed, the same numerical symbols are attached to the same components as in the above-mentioned embodiment and description thereof is omitted. The positioning means 40' in this embodiment is comprised of, as shown in FIG. 8A through FIG. 8C, a contact member 42' supported in a manner enabling it to move in a predetermined direction, a compression spring 44' as a pushing member, and the eccentric pin 43 as a stopper.

The contact member 42' is formed into a rough L shape, one end 42a' thereof faces the vicinity of one end side of the guide hole 10c, the other end 42b' of the contact member 42' is disposed in the vicinity of the eccentric pin 43, and the contact member 42' is supported so as to be able to reciprocate in the direction shown by the arrow L as a whole. The one end 42a' comes into contact with and separates from the drive pin 31c, and the other end 42b' comes into contact with and separates from the cam portion 43b of the eccentric pin 43.

Regarding the compression spring 44', as shown in FIG. 8A, the one end 44a' is latched on the curved piece 10f of the base plate 10, the other end 44b' is latched on the other end 42b' of the contact member 42', whereby the compression spring 44' pushes the contact member 42' so as to make the other end 42b' come into contact with the cam portion 43b of the eccentric pin 43.

The operation of this positioning means 40' is substantially the same as that of the above-mentioned positioning means 40, so that an impulse force due to an inertial force of the shutter blade 20 can be absorbed and eased as mentioned above. Therefore, the collision noise is suppressed, part breakage is prevented, and durability is improved.

Figure 9A:
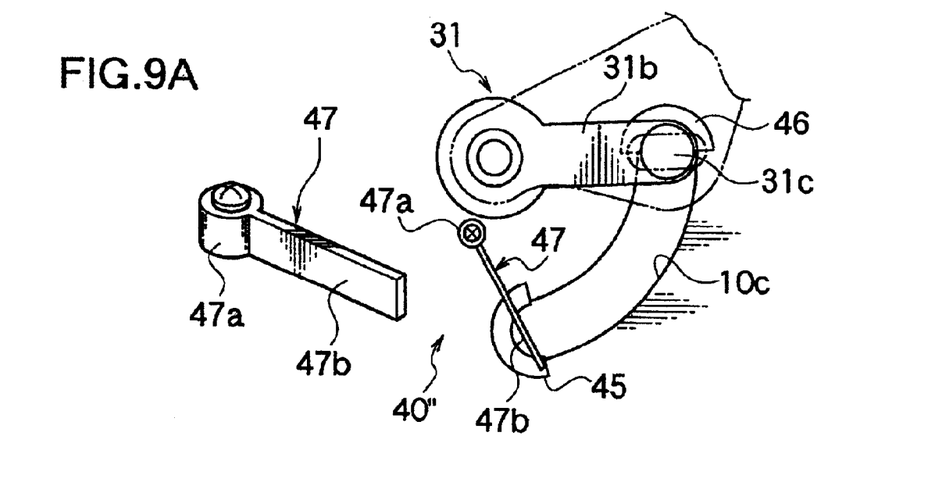
FIG. 9A is a plan view showing a condition after the shutter blade has run.
Figure 9B:
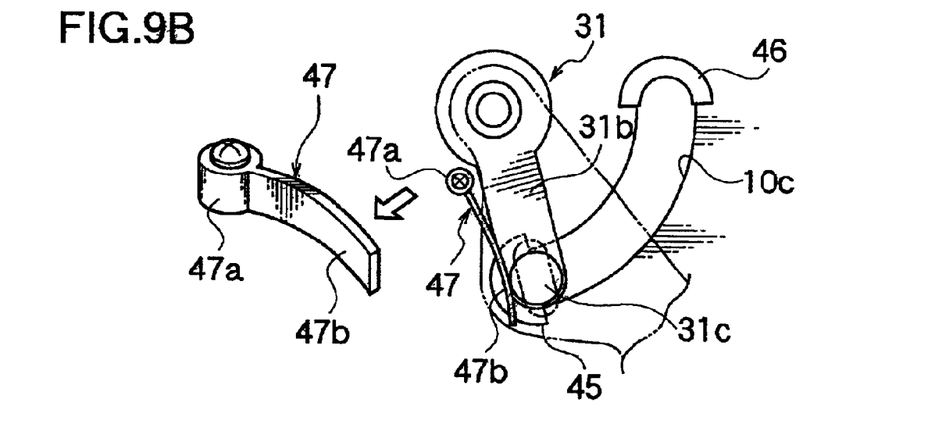
FIG. 9B is a plan view showing a condition where the shutter blade has moved to the operation starting position side and retreated while deforming a leaf spring.
Figure 9C:
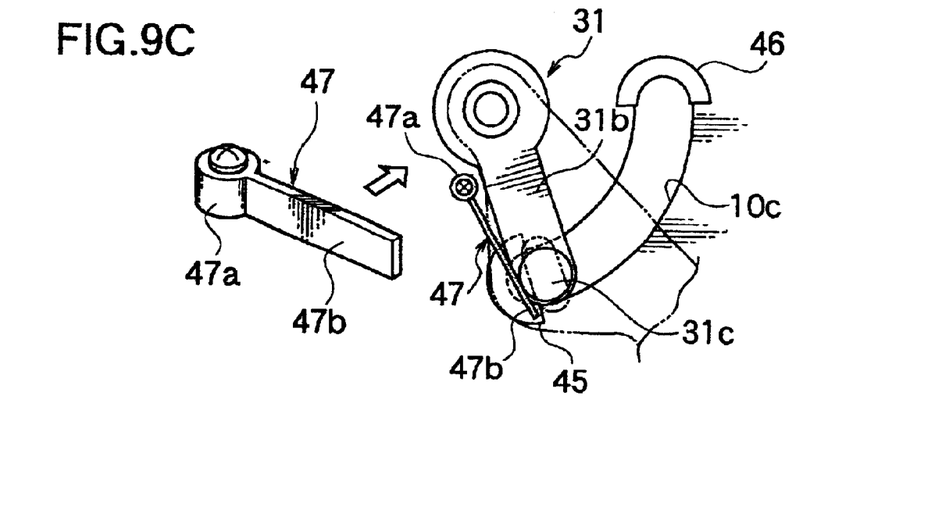
FIG. 9C is a plan view showing a condition where the leaf spring has elastically returned, pushed back the drive pin, and positioned the shutter blade at the operation starting position.

FIG. 9A, FIG. 9B, and FIG. 9C show still another embodiment of the camera focal plane shutter according to the invention, wherein since the construction is the same as in the above-mentioned embodiment except for a different positioning means 40" employed, the same numerical symbols are attached to the same components as in the above-mentioned embodiment and description thereof is omitted. The positioning means 40" in this embodiment has a leaf spring 47 as a cantilever-shaped elastic member, one end 47a of which is fixed to the base plate 10 and the other end 47b of which is formed to be a free end.

That is, when the drive arm 31b rotates from the condition of FIG. 9A and the drive pin 31c comes into contact with the leaf spring 47, due to the impulse force, the leaf spring 47 elastically deforms and warps by a predetermined amount as shown in FIG. 9B. By this warp, the impulse force is absorbed and eased. At this time, elastic energy charged by this elastic deformation acts in the direction for pushing back the drive pin 31c, and as shown in FIG. 9C, the leaf spring 47 returns (is restored) to the original shape without deformation, whereby the shutter blade 20 is positioned at the operation starting position.

Herein, the bending rigidity of the leaf spring 47 is set so that the leaf spring 47 deforms due to an impulse force caused by a collision with the drive pin 31c and overcomes a magnetic urging force generated by the rotor 31 of the electromagnetic actuator 30. If a stopper is provided at the return side of the leaf spring 47, positioning to the operation starting position can be more securely carried out.

Thus, by using the leaf spring 47 with desired bending rigidity, an impulse force can be absorbed and eased, a collision noise is suppressed, part breakage is prevented, and durability is improved. Furthermore, the structure can be simplified and the weight and size can be reduced. Furthermore, by properly adjusting the attaching angle of the leaf spring 47, the operation starting position can be properly set.

FIG. 10 through FIG. 13 show still another embodiment of the camera focal plane shutter according to the invention. The camera focal plane shutter of this embodiment is comprised of, as shown in FIG. 10 through FIG. 13, a base plate 100 having an exposure aperture 100a, a first shutter blade 200 and a second shutter blade 210 for opening and closing the aperture 100a, a first electromagnetic actuator 300 and a second electromagnetic actuator 310 which are disposed on the left side of the aperture 100a and directly drive the first shutter blade 200 and the second shutter blade 210, respectively, and a first positioning means 400 and a second positioning means 410 for positioning the first shutter blade 200 and the second shutter blade 210 at the operation starting positions, respectively.

Figure 10:
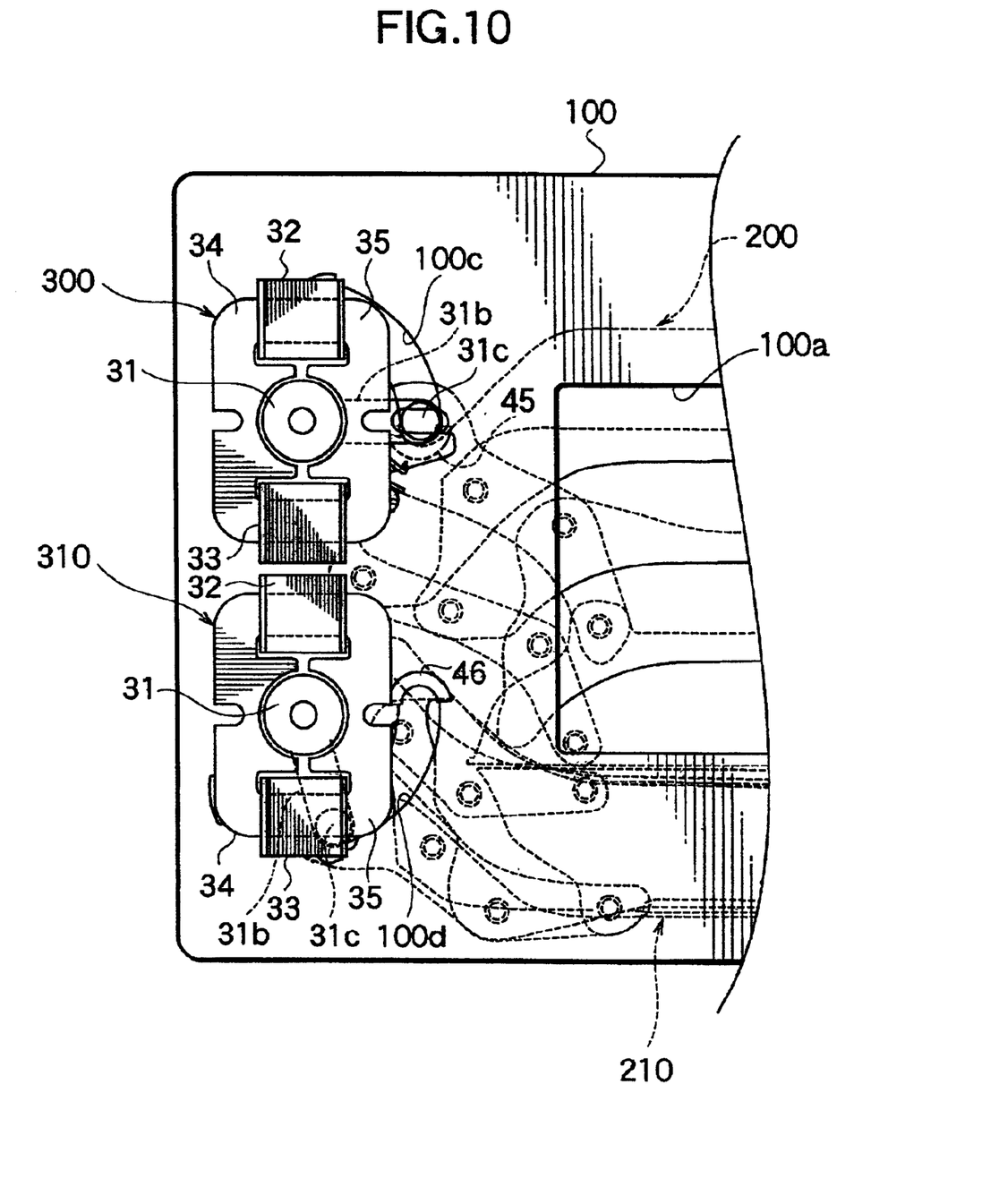
FIG. 10 is a plan view showing another embodiment of the focal plane shutter relating to the invention.

The first electromagnetic actuator 300 and the second electromagnetic actuator 310 have the same construction as that of the above-mentioned electromagnetic actuator 30, so that the same symbols are attached to them and description thereof is omitted. The first positioning means 400 and the second positioning means 40 have the same construction as that of the above-mentioned positioning means 40, so that the same symbols are attached to them and description thereof is omitted.

Figure 12:
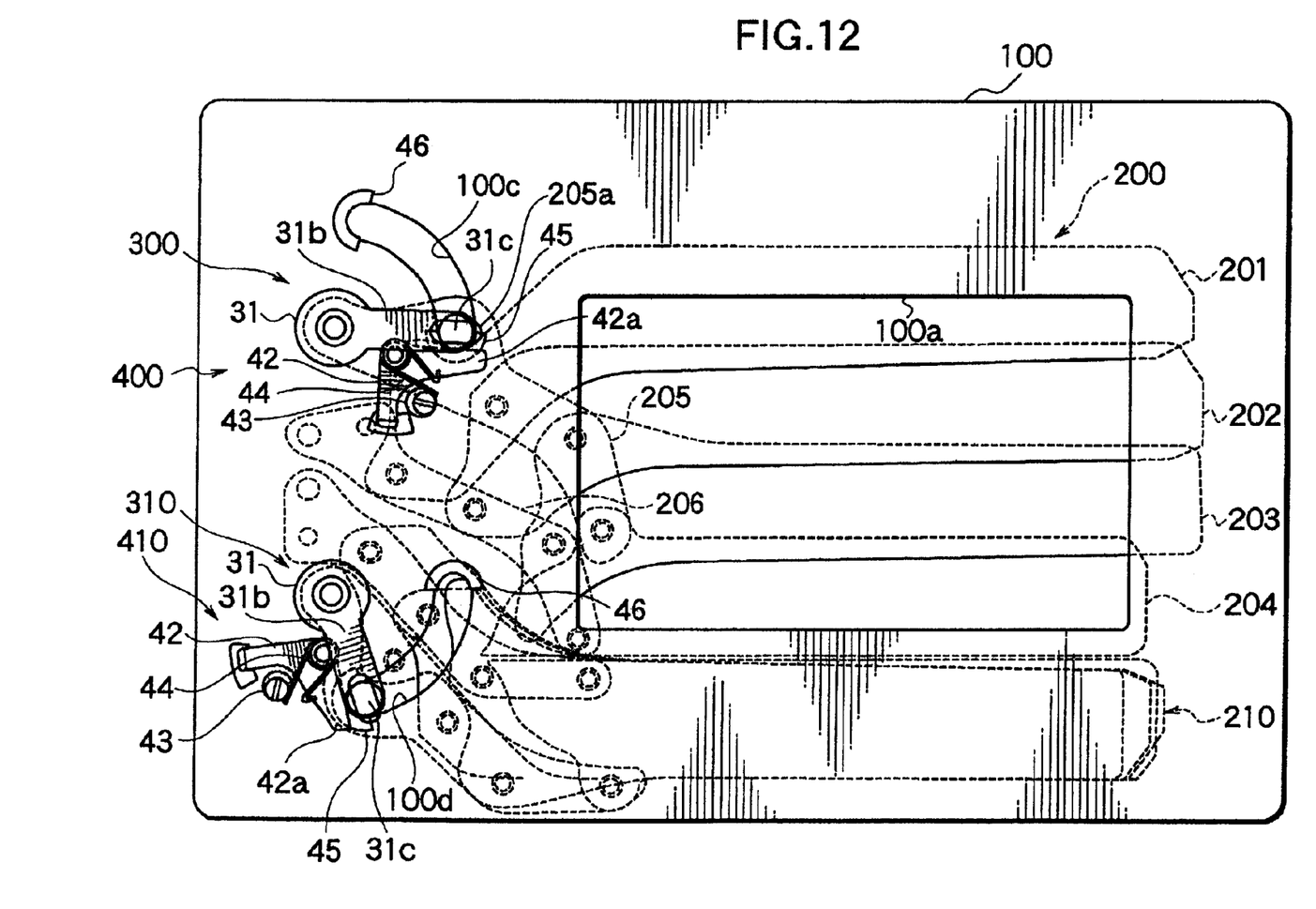
FIG. 12 is a plan view showing a condition where the first shutter blade and the second shutter blade have moved toward the operation starting position but have not been positioned yet at the operation starting position in another embodiment.
Figure 13:
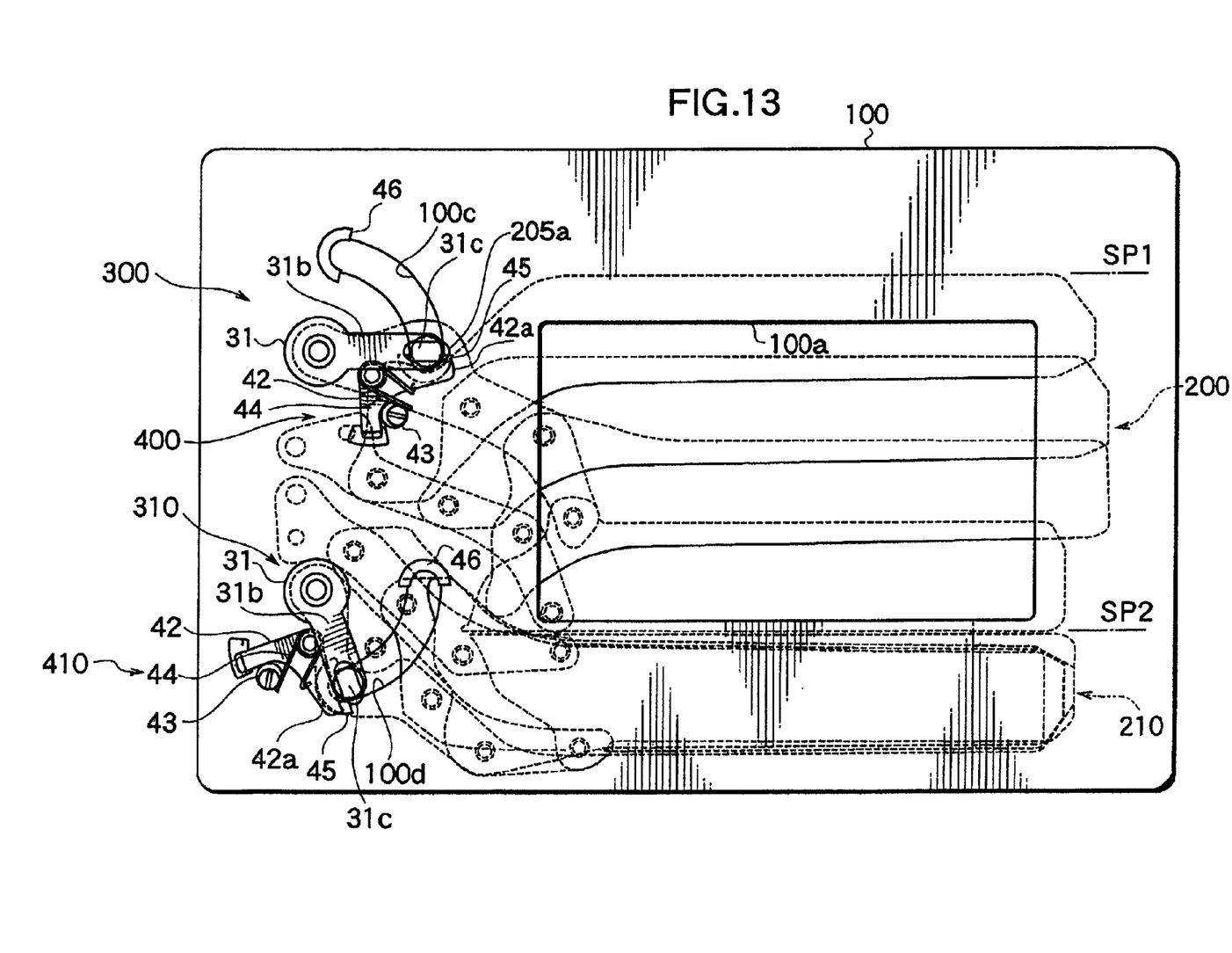
FIG. 13 is a plan view showing a condition where the first shutter blade and the second shutter blade have been positioned at the operation starting position in another embodiment.

The first shutter blade 200 is comprised of, as shown in FIG. 12 and FIG. 13, a plurality (herein, four) of blades 201, 202, 203, and 204, and a first arm 205 and a second arm 206 for rotatably connecting the blades 201 and 204. The first arm 205 and the second arm 206 are rotatably supported on support shafts provided on the back surface of the base plate 100, respectively, as in the above-mentioned embodiment.

As shown in FIG. 12, the drive pin 31c of the first electromagnetic actuator 300 is connected into a slot 205a of the first arm 205.

Figure 11:
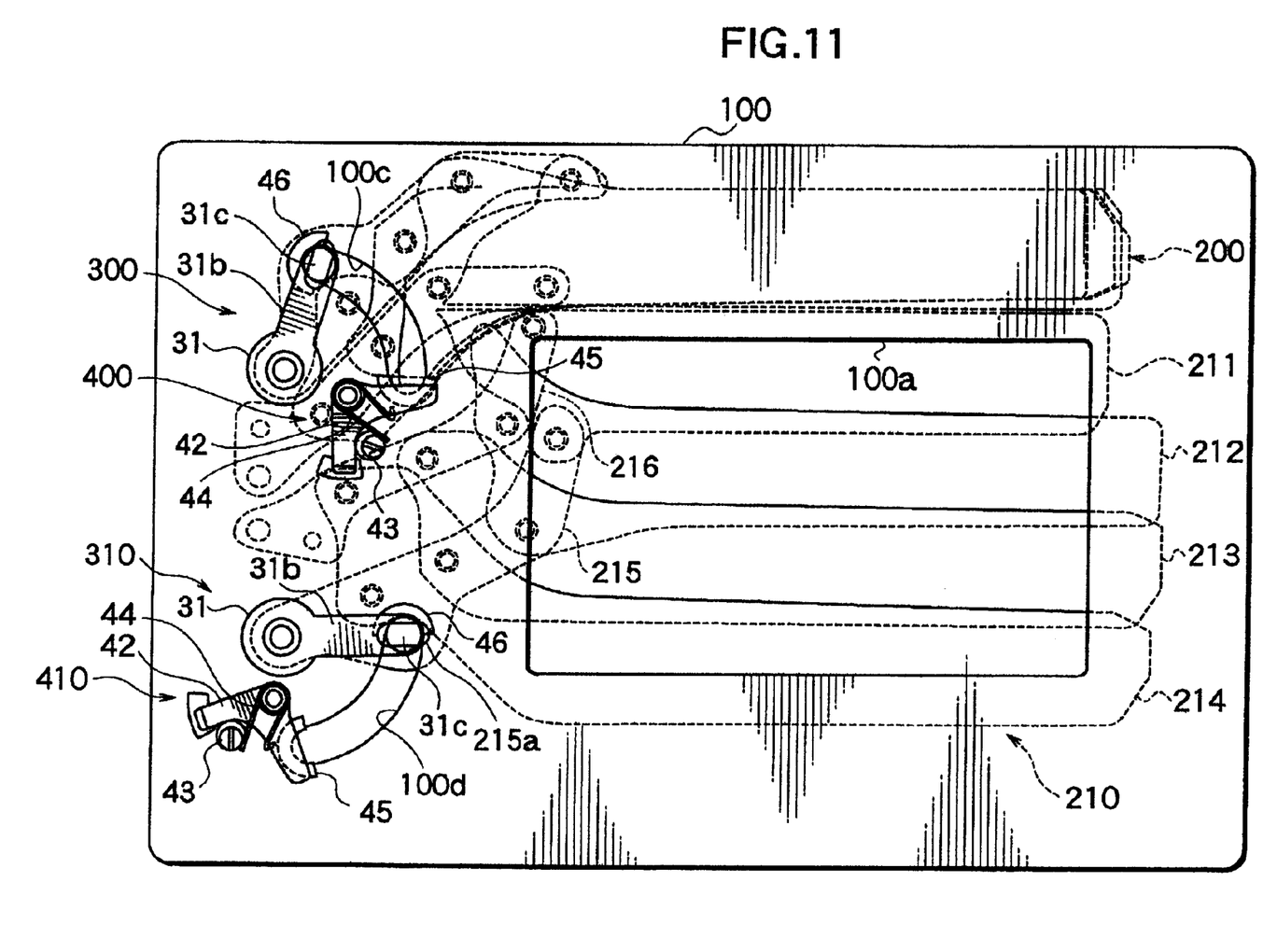
FIG. 11 is a plan view showing a condition where a first shutter blade and a second shutter blade have run and closed the aperture in another embodiment.

Therefore, when the rotor 31 of the first electromagnetic actuator 300 rotates by approximately 70°, the first arm 205 and the second arm 206 swing, and the blades 201 through 204 roughly linearly reciprocate between the closing position at which the blades develop to the lower side as shown in FIG. 13 to close the aperture 100a and the opening position at which the blades overlap at the upper side as shown in FIG. 11 to open the aperture 100a.

The second shutter blade 210 is comprised of, as shown in FIG. 11, a plurality (herein, four) of blades 211, 212, 213, and 214, and a first arm 215 and a second arm 216 for rotatably connecting the blades 211 through 214. The first arm 215 and the second arm 216 are rotatably supported on support shafts provided on the back surface of the baseplate 100, respectively, as in the above-mentioned embodiment.

As shown in FIG. 11, the drive pin 31c of the second electromagnetic actuator 310 is connected into a slot 215a of the first arm 215.

Therefore, when the rotor 31 of the second electromagnetic actuator 310 rotates by approximately 70°, the first arm 215 and the second arm 216 swing, the blades 211 through 214 roughly linearly reciprocate between the opening position at which the blades overlap at the lower side as shown in FIG. 13 to open the aperture 100a and the closing position at which the blades develop at the upper side as shown in FIG. 11 to close the aperture 100a.

As in the abovementioned embodiment, the two guide holes 100c and 100d formed in the base plate 100 are provided with rubbers 45 at one end and rubbers 46 at the other end, respectively.

Next, in the case that this camera focal plane shutter is carried on a film type camera, the operation is explained with reference to FIG. 11 through FIG. 13.

First, in a condition where the main switch of the camera is turned ON and photographing is completed, as shown in FIG. 11, two rotors 31 of the first electromagnetic actuator 300 and the second electromagnetic actuator 310 are at angular positions after rotating counterclockwise by approximately 70°, and the drive pins 31c are in contact with the rubbers 46 of the upper ends of the guide holes 100c and 100d, the first shutter blade 200 stops at a position (opening position) to open the aperture 100a, and the second shutter blade 210 stops at a position (closing position) to close the aperture 100a.

After the above-mentioned exposure operation is completed, first, when the rotor 31 of the first electromagnetic actuator 300 rotates clockwise and the drive pin 31c thereof moves toward the lower end of the guide hole 100c, the first shutter blade 200 moves toward the closing position.

Then, the drive pin 31c of the first electromagnetic actuator 300 rotates the swing arm 42 clockwise by means of the inertial force against a pushing force of the torsion spring 44, while coming into contact with the end 42a of the swing arm 42 of the first positioning means 400.

Thereafter, as shown in FIG. 12, the drive pin 31c of the first electromagnetic actuator 300 comes into contact with the rubber 45, slightly compresses and deforms the rubber 45, and then stops. In this process, the impulse force caused by the drive pin 31c of the first electromagnetic actuator 300 is converted into charged energy of the torsion spring 44 and absorbed and eased by the deformation of the rubber 45.

Next, when the rotor 31 of the second electromagnetic actuator 31 rotates clockwise, and the drive pin 31c thereof moves toward the lower end of the guide hole 10d, the second shutter blade 210 moves toward the opening position.

Then, the drive pin 31c of the second electromagnetic actuator 310 rotates the swing arm 42 clockwise by means of the inertial force against the pushing force of the torsion spring 44, while coming into contact with the end 42a of the swing arm 42 of the second positioning means 410.

Thereafter, as shown in FIG. 12, the drive pin 31c of the second electromagnetic actuator 310 comes into contact with the rubber 45, slightly compresses and deforms the rubber 45, and then stops. In this process, the impulse force caused by the drive pin 31c of the second electromagnetic actuator 310 is converted into charged energy of the torsion spring 44, and absorbed and eased by the deformation of the rubber 45.

Thus, in the case that the rotational driving forces of the first electromagnetic actuator 300 and the second electromagnetic actuator 310 (two rotors 31) restore the first shutter blade 200 and the second shutter blade 210 to the operation starting positions, the first positioning means 400 and the rubber 45 absorb and ease the impulse force due to the inertial force of the first shutter blade 200, and the second positioning means 410 and the rubber 45 absorb and ease the impulse force due to the inertial force of the second shutter blade 210, so that collision noises are suppressed, part breakage is prevented, and durability is improved.

As shown in FIG. 13, by the pushing force of the charged torsion spring 44, the swing arm 42 of the first positioning means 400 is rotated counterclockwise, and then stops when the one end 42a pushes back the drive pin 31c of the first electromagnetic actuator 300 and separates the drive pin 31c from the rubber 45 and the other end 42b comes into contact with the cam portion 43b of the eccentric pin 43, and on the other hand, the swing arm 42 of the second positioning means 410 is rotated counterclockwise, and stops when the one end 42a pushes back the drive pin 31c of the second electromagnetic actuator 310 and separates the drive pin 31c from the rubber 45 and the other end 42b comes into contact with the cam portion 43b of the eccentric pin 43.

At this time, on the rotors 31 of the first electromagnetic actuator 300 and the second electromagnetic actuator 310, magnetic urging forces which exert clockwise rotational forces act in a non-energized condition. On the other hand, on the swing arms 42 of the first positioning means 400 and the second positioning means 410, the pushing forces of the torsion springs 44, which are greater than the magnetic urging forces, act in the opposite direction.

Therefore, whit the drive pin 31c of the first electromagnetic actuator 300 coming into contact with the one end 42a of the swing arm 42 of the first positioning means 400, when the other end 42b comes into contact with the cam portion 43b and the swing arm 42 stops, the driven pin 31c simultaneously stops. Accordingly, the first shutter blade 200 is positioned at the operation starting position SP1. Furthermore, with the drive pin 31c of the second actuator 310 coming into contact with the one end 42a of the swing arm 42 of the second positioning means 410, when the other end 42b comes into contact with the cam portion 43b and the swing arm 42 stops, the drive pin 31c simultaneously stops. Accordingly, the second shutter blade 210 is positioned at the operation starting position SP2.

Thus, before starting an exposure operation, since the first shutter blade 200 is positioned at the operation starting position SP1 and the second shutter blade 210 is positioned at the operation starting position SP2 by the first positioning means 400 and the second positioning means 410, timing accuracy is improved, and therefore, an exposure operation is carried out at a predetermined stable timing, and an exposure operation which is stable as a whole is realized.

In this standby status, when a photographer carries out a release operation, first, the rotor 31 of the first electromagnetic actuator 300 starts rotating counterclockwise, and the blades of the first shutter blade 200 momentarily overlap each other to open the aperture 100a, and after a predetermined time elapses, the rotor 31 of the second electromagnetic actuator 310 starts rotating counterclockwise, and the blades of the second shutter blade 210 momentarily develop to close the aperture 100a. Therefore, the first shutter blade 200 and the second shutter blade 210 move to the positions shown in FIG. 11 to complete an exposure operation.

Hereinafter, the same sequence is repeated for photographing. Even in the case of serial photographing, high-speed serial photographing is possible without lowering the frame speed.

The operation starting positions SP1 and SP2 are properly set to be desired positions by adjusting the angular positions of the eccentric pins 43.

In this embodiment, the case where the first shutter blade 200 and the second shutter blade 210 are caused to run from one side to carry out an exposure operation is shown, however, a construction may be employed in which the above-mentioned positioning means are disposed at the vicinities of both ends of the guide holes 100c and 100d so that the shutter blades are caused to run from one side to carry out an exposure operation and then also caused to run from the other side to carry out an exposure operation.

In this embodiment, the positioning means 40 is employed, however, the positioning means 40' and 40" shown in FIG. 8A through FIG. 8C and FIG. 9A through FIG. 9C may be employed.

As mentioned above, according to the camera focal plane shutter of the invention, the positioning means for positioning the shutter blade at the operation starting position is formed so as to position the shutter blade at the operation starting position while easing an impulse force when the shutter blade is moved toward the operation starting position, so that positioning is carried out while an impulse force due to an inertial force of the shutter blade being eased. Therefore, the collision noise is suppressed, part breakage is prevented, and durability is improved.

Furthermore, by providing an absorbing member which comes into contact with the interlocking member after the contact member comes into contact with the interlocking member to ease an impulse force, an easing effect is exerted by the contact member first, and then an easing effect is exerted by the absorbing member, so that an impulse force can be securely absorbed and eased.

Furthermore, by using an elastic member such as a leaf spring which can be elastically deformed as a positioning means, the structure can be simplified, and the size and weight can be reduced.

What is claimed is:

1. A camera focal plane shutter comprising:
   a shutter blade for opening and closing an exposure aperture to carry out an exposure operation;
   an electromagnetic drive source for directly driving the shutter blade;
   an interlocking member for interlocking with the shutter blade; and
   a positioning means for positioning the shutter blade at an operation starting position, including a contact member which is movably supported and comes into contact with the interlocking member when the shutter blade returns to the operation starting position after an exposure operation, a pushing member for applying a pushing force so as to push the contact member against the interlocking member, and a stopper for stopping the contact member that is moved toward a direction of an exposure operation of the shutter blade by the pushing force of the pushing member at the operation starting position.

2. A camera focal plane shutter according to claim 1, further comprising:
   an absorbing member, when the shutter blade returns to the operation starting position after an exposure operation, coming into contact with the interlocking member after the contact member comes into contact with the interlocking member, and easing an impulse force.

3. A camera focal plane shutter comprising:
   a shutter blade for opening and closing an exposure aperture to carry out an exposure operation;
   an electromagnetic drive source for directly driving the shutter blade;
   an interlocking member for interlocking with the shutter blade, wherein the interlocking member is a drive arm which is directly driven by a driving force from the electromagnetic drive source and is connected to a part of the shutter blade; and
   a positioning means for positioning the shutter blade at an operation starting position, including a contact member which can come into contact with the interlocking member and is moveably supported, and wherein the contact member is a swing arm supported around a predetermined shaft in a manner enabling it to swing, a pushing member for applying a pushing force so as to push the contact member against the interlocking member, the pushing member being a torsion spring disposed around a predetermined shaft, and one end of the pushing member is latched on a stopper and the other end is latched on the swing arm, the stopper being utilized to stop the contact member at a predetermined position against the pushing force of the pushing member.

4. A camera focal plane shutter comprising:
   a shutter blade for opening and closing an exposure aperture to carry out an exposure operation;
   an electromagnetic drive source for directly driving the shutter blade;
   an interlocking member for interlocking with the shutter blade;
   a positioning means for positioning the shutter blade at an operation starting position, including a contact member which can come into contact with the interlocking member and is moveably supported, a pushing member for applying a pushing force so as to push the contact member against the interlocking member, and a stopper for stopping the contact member at a predetermined position against the pushing force of the pushing member; and
   an absorbing member, when the shutter blade returns to the operation starting position after an exposure operation, coming into contact with the interlocking member after the contact member comes into contact with the interlocking member, and easing an impulse force, wherein
      the interlocking member is a drive arm which is directly driven by a driving force from the electromagnetic drive source and is connected to a part of the shutter blade,
      the contact member is a swing arm supported around a predetermined shaft in a manner enabling it to swing, and
      the pushing member is a torsion spring disposed around the predetermined shaft, and one end of the pushing member is latched on the stopper and the other end is latched on the swing arm.

5. A camera focal plane shutter comprising:
   a shutter blade for opening an exposure aperture to carry out an exposure operation;
   an electromagnetic drive source for directly driving the shutter blade;
   an interlocking member for interlocking with the shutter blade; and
   an elastic member for positioning the shutter blade at an operation starting position, one end of which is fastened by a screw so as to be capable of adjusting a mounting angle position of the elastic member by loosening the screw and the other end of which is elastically deformable in response to contact with the interlocking member when the shutter blade returns to the operation starting position after an exposure operation.

6. A camera focal plane shutter comprising:
   a shutter blade for opening and closing an exposure aperture to carry out an exposure operation;
   a springless electromagnetic drive source for directly driving the shutter blade, said electromagnetic drive source being directly coupled to an interlocking member for interlocking with the shutter blade; and
   a positioning means for positioning the shutter blade at an operation starting position, including a contact member which is movably supported and comes into contact with the interlocking member when the shutter blade returns to the operation starting position after an exposure operation, a pushing member for applying a pushing force so as to push the contact member against the interlocking member, and a stopper for stopping the contact member that is moved toward a direction of an exposure operation of the shutter blade by the pushing force of the pushing member at the operation starting position.

7. A camera focal plane shutter according to claim 6, further comprising:
   an absorbing member, when the shutter blade returns to the operation starting position after an exposure operation, coming into contact with the interlocking member after the contact member comes into contact with the interlocking member, and easing an impulse force.

* * * * *